(12) United States Patent
Shin

(10) Patent No.: US 8,797,643 B2
(45) Date of Patent: Aug. 5, 2014

(54) LIGHT IRRADIATION APPARATUS

(75) Inventor: Dong Cheon Shin, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 759 days.

(21) Appl. No.: 12/654,068

(22) Filed: Dec. 9, 2009

(65) Prior Publication Data

US 2010/0157420 A1 Jun. 24, 2010

(30) Foreign Application Priority Data

Dec. 24, 2008 (KR) .................. 10-2008-0133810

(51) Int. Cl.
*G02B 5/30* (2006.01)
*G02B 27/28* (2006.01)

(52) U.S. Cl.
CPC ............ *G02B 27/286* (2013.01); *G02B 5/3075* (2013.01)
USPC .......................................... 359/352; 359/361

(58) Field of Classification Search
CPC .... G02B 5/3025; G02B 5/1857; G02B 5/208; G02B 5/3075; G02B 5/3091; G02B 26/02; G02B 27/283; G02F 1/133788; G02F 1/133634; G02F 1/133711; G02F 1/1303; G02F 1/13342; G02F 1/133615; G02F 1/13362; G02F 1/13363; G02F 1/133753; G02F 1/13378; G02F 1/133784; G02F 1/31; G02F 2001/133565; G02F 2001/133761; G02F 2001/133765; G02F 2001/133792; G02F 2202/022; G02F 2202/36; G02F 2202/40; G02F 2203/02; G02F 2203/06; G02F 2413/02; G02F 2413/07; G02F 2413/09

USPC ............ 349/92–94, 123–124, 139–140, 191; 250/504 R; 359/361, 485.02–485.04, 359/352

See application file for complete search history.

(56) References Cited

U.S. PATENT DOCUMENTS

| | | | | |
|---|---|---|---|---|
| 5,934,780 A | * | 8/1999 | Tanaka | 362/19 |
| 6,190,016 B1 | * | 2/2001 | Suzuki et al. | 362/19 |
| 6,307,609 B1 | * | 10/2001 | Gibbons et al. | 349/124 |
| 6,696,114 B1 | * | 2/2004 | Kawatsuki et al. | 428/1.2 |
| 6,791,749 B2 | * | 9/2004 | DelPico et al. | 359/485.02 |
| 7,092,058 B2 | * | 8/2006 | Sakai et al. | 349/124 |
| 2005/0088730 A1 | * | 4/2005 | Sangu et al. | 359/362 |
| 2005/0140885 A1 | * | 6/2005 | Leidig et al. | 349/124 |
| 2007/0153184 A1 | * | 7/2007 | Ham et al. | 349/126 |

FOREIGN PATENT DOCUMENTS

| | | |
|---|---|---|
| CN | 1991492 A | 7/2007 |
| JP | 2003344858 A | 12/2003 |
| JP | 2004029180 A | 1/2004 |
| JP | 2005-128271 A | 5/2005 |
| KR | 10-1999-0037466 | 5/1999 |
| KR | 10-2000-0057953 | 9/2000 |
| KR | 10-2008-0018853 | 2/2008 |

\* cited by examiner

*Primary Examiner* — Stephone B Allen
*Assistant Examiner* — Jeffrey Madonna
(74) *Attorney, Agent, or Firm* — McKenna Long & Aldridge LLP

(57) ABSTRACT

A light irradiation apparatus adapted to form an alignment of an LCD device through a photo alignment process is disclosed. The light irradiation apparatus includes a light source generating ultraviolet light, a polarizer polarizing the ultraviolet light generated in the light source, and a filter blocking off the polarized light from the polarizer except an effective wavelength band of light for a photo alignment.

1 Claim, 5 Drawing Sheets

LIGHT IRRADIATION APPARATUS

CROSS-REFERENCE TO RELATED APPLICATION

This application claims priority under 35 U.S.C. 119 to Korean Patent Application No. 10-2008-0133810, filed on Dec. 24, 2008, which is hereby incorporated by reference in its entirety.

BACKGROUND

1. Field of the Disclosure

This disclosure relates to a light irradiation apparatus adapted to photo-process an alignment film of a liquid crystal display panel.

2. Description of the Related Art

Display device markets have changed in the center of flat panel display devices, which have a light weight and are thin, unlike the previous CRT (cathode ray tube). The flat panel display devices include liquid crystal display (LCD) devices, field emission display (FED) devices, plasma display panels (PDPs), light emitting diode (LED) display devices, and others.

Among the flat panel display devices, LCD devices each can include an LCD panel, a driving unit, and a backlight unit. The LCD panel displays an image on it. The driving unit applies driving signals to the LCD panel. The backlight unit applies light to the LCD panel.

The LCD panel includes first and second substrates disposed opposite each other and combined to maintain a cell gap between them, and a liquid crystal layer interposed between the substrates.

On the first substrate, a plurality of gate lines are formed, a plurality of data lines are formed to cross the plurality of gate lines, and a plurality of transistors TFT are formed at the intersections of the plurality of gate lines and the plurality of data lines. The first substrate is divided into a plurality of pixel regions by the crossing of the gate and data lines.

The second substrate includes a black matrix and a plurality of color filters. The black matrix is used for blocking light on the regions that are not the pixel regions. The plurality of color filters are used for realizing colors.

Also, alignment films are formed on the first and second substrates, respectively. To form the alignment films, a rubbing process is mainly used. The rubbing process forms an alignment film by coating an alignment material such as PI (polyimide) on a substrate and putting a rubbing cloth into physical contact with the substrate on which the alignment film is formed. The physical contact allows an alignment film to have an alignment direction. Such a rubbing process makes it possible to process at high-speed an enlarged sized of alignment film. Therefore, the rubbing process is widely used in the formation of an alignment film.

However, the rubbing process causes fine flaws on the alignment film due to unevenness in rubbing strength, so that liquid crystal molecules are not uniformly oriented. As such, irregular phase distortion and light dispersion are caused. Accordingly, the performance of the LCD device is deteriorated. Moreover, since the rubbing process may generate static electricity and contamination of the alignment film by fine dust and particles, the productive ratio of LCD device (and/or panel) is reduced.

To solve the problem in the rubbing process, a variety of photo alignment methods have been researched. Among the photo alignment methods, a UV alignment method has been highlighted which irradiates UV (ultraviolet) light on a high polymer film in order to form a liquid crystal alignment film.

The photo alignment method using UV light eliminates the possibility of causing static electricity and the contamination of the alignment film and prevents the decrement of the productive ratio of the LCD device (and/or panel). Also, the UV alignment method allows liquid crystal molecules to be uniformly oriented on the entire surface of the alignment film, thereby enhancing the alignment degree of liquid crystal molecules.

However, the photo alignment causes undesired reactions, such as a photo-oxidation reaction and others, due to the shorter wavelength light being below an effective wavelength for the photo alignment on the high polymer film. The undesired rejection reaction generates carboxylic acids which are included in a functional material group. As the carboxylic acids largely affect a residual image on the LCD device, the UV alignment method has recently revealed a serious problem of generating these carboxylic acids.

BRIEF SUMMARY

Accordingly, the present embodiments are directed to a light irradiation apparatus that substantially obviates one or more of problems due to the limitations and disadvantages of the related art.

An object of the present embodiment is to provide a light irradiation apparatus adapted to form an alignment of an LCD device through a photo alignment process.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a light irradiation apparatus includes: a light source configured to generate ultraviolet light; a polarizer configured to polarize the ultraviolet light generated in the light source; and a filter configured to block off the polarized light from the polarizer except an effective wavelength band of light for a photo alignment.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
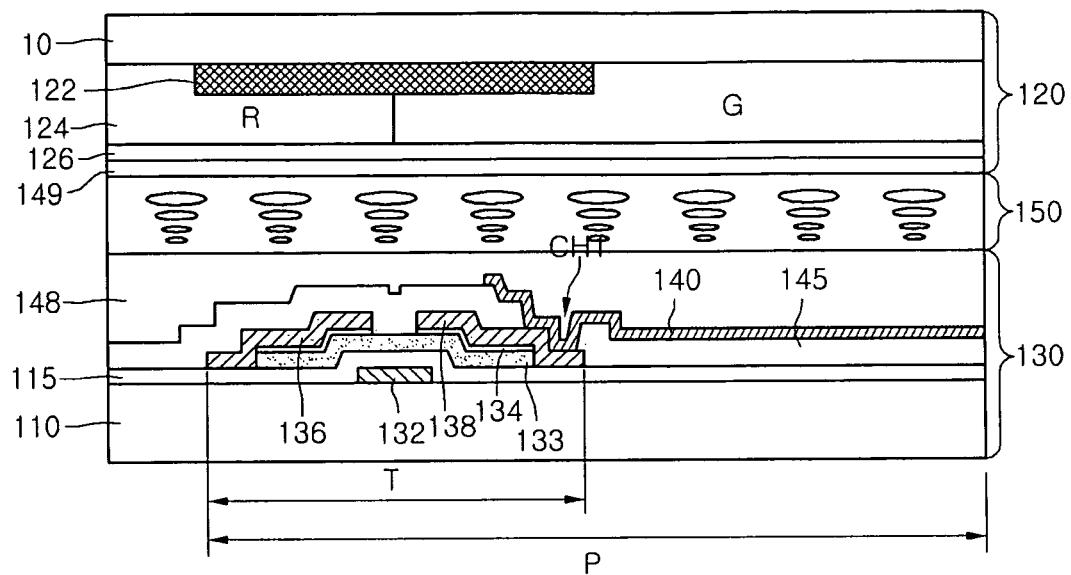
FIG. 1 is a cross-sectional view showing a unit pixel included in an LCD device.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a cross-sectional view showing a unit pixel included in an LCD device. Referring to FIG. 1, an LCD device includes upper and lower substrate 120 and 130 facing each other, and a liquid crystal layer 150 interposed between the upper and lower substrates 120 and 130. The upper substrate 120 includes a plurality of color filters formed on it. The lower substrate 130 includes thin film transistor array formed on it.

Although it is not fully shown in the drawings, the lower substrate 130 includes a gate electrode 132 which is formed as an extension from a gate line (not shown) on a first transparent substrate 110. The lower substrate 130 further includes a gate insulation film 115 formed on the entire surface of the first transparent substrate 110 which is loaded with the gate electrode 132.

A source electrode 136 and a drain electrode 138 are formed to be separated in a fixed distance from each other on the gate insulation film 115. The source and drain electrodes 136 and 138 are arranged to partially overlap with the gate electrode 132. The source electrode 136 extends from a data line (not shown) which defines a pixel region P by crossing the gate line 132. Also, a semiconductor layer 133 and an ohmic contact layer 134 are formed between the gate electrode 132 and the source/drain electrodes 136 and 138, as a channel region. These gate electrode 132, semiconductor layer 133, ohmic contact layer 134, and source/drain electrodes 136 and 138 configure a thin film transistor T.

A passivation film (or a protective film) 145 is formed on the entire surface of the first transparent substrate with the source/drain electrodes 136 and 138. The passivation layer 145 includes a contact hole CH1 partially exposing the drain electrode 138. Also, a pixel electrode 140 contacting the drain electrode 138 through the contact hole CH1 is formed on the passivation layer 145. Thereafter, a lower alignment film 148 controlling an alignment direction of liquid crystal is formed on the entire surface of the passivation layer 145 loaded with the pixel electrode 140.

The upper substrate 120 includes a black matrix 122, and red, green, and blue color filters 124 which are formed on a second transparent substrate 10. The black matrix 122 blocks off light in non-display regions. The red, green, and blue color filters 124 are arranged opposite to display regions. To rectify this, the black matrix 122 is positioned on the boundary regions between the color filters 124. Also, a common electrode 126 and an upper alignment film 149 are sequentially formed on the red, green, and blue color filters 124. The upper alignment film 149 on the common electrode 126 faces the lower alignment film 148.

Figure 3:
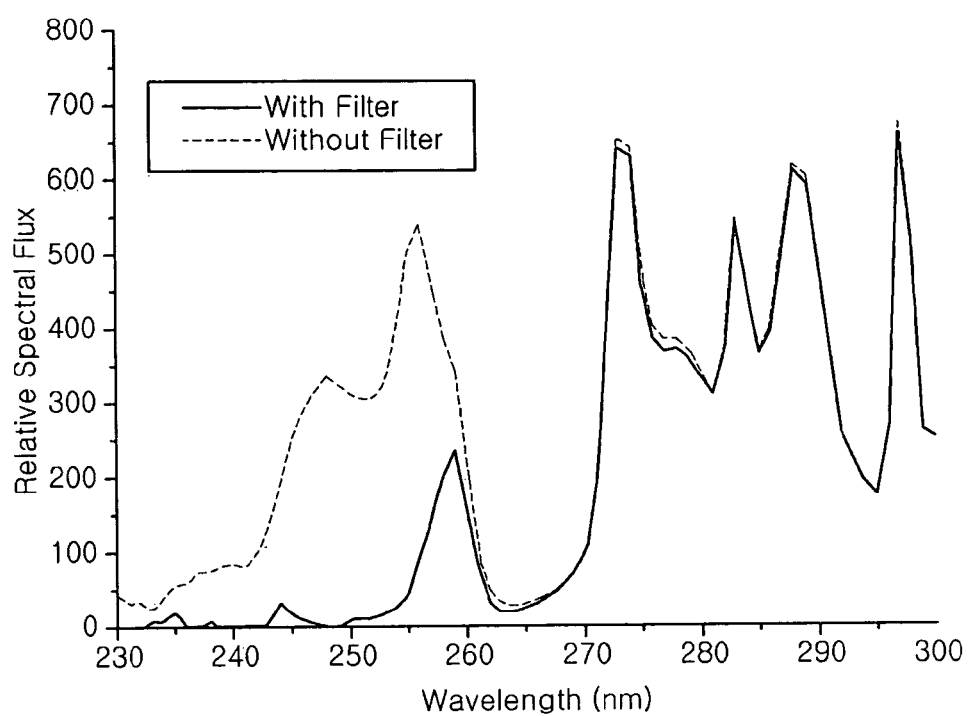
FIG. 3 is a data sheet representing a light spectrum of a light irradiation apparatus with a filter according to a first embodiment of the present disclosure.

A light irradiation apparatus for photo-processing the upper and lower alignment films 148 and 149 of an LCD device will now be explained in detail referring to FIGS. 3 and 4.

Figure 2:
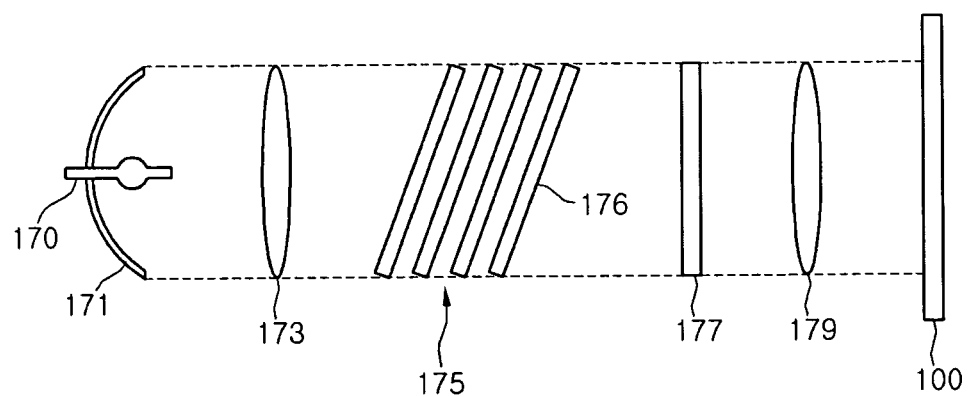
FIG. 2 is a schematic diagram showing the configuration of a UV light irradiation apparatus according to a first embodiment of the present disclosure.

FIG. 2 is a schematic diagram showing the configuration of a light irradiation apparatus according to a first embodiment of the present disclosure. FIG. 3 is a data sheet representing a UV light spectrum of a light irradiation apparatus with a filter according to a first embodiment of the present disclosure.

As shown in FIG. 2, a light irradiation apparatus according to a first embodiment of the present disclosure is configured to include a light source 170, a convergent unit 171, a lens 173, a polarizer 175, a filter 177, and a collimator 179. The light source 170 is configured to generate UV light. The convergent unit 171 is configured to converge the UV light emitted from the light source 170 in one direction. The lens 173 is configured to diffuse and converge the UV light generated in the light source 170. The polarizer 175 is configured to polarize the UV light from the lens 173. The filter 177 is configured to pass a specific wavelength band of lights among a board wavelength band of lights from the polarizer 175 through it. The collimator 179 is configured to guide the light from the filter 177 toward a substrate 100.

The polarizer 175 is configured to include a plurality of quartz plates 176. For example, the polarizer 175 can include 4 quartz plates 176, in order to polarize non-polarized light to pass through it. The non-polarized light supplied to the polarizer 175 has a Brewster's angle B. The non-polarized light is partially reflected by and permeated through the polarizer 175, so that polarized light is irradiated onto an alignment film formed on the substrate 100. The Brewster's angle B depends on an inclination angle which is defined by the inclined quartz plate 176 and a horizontal line. Also, the polarizer 175 can have a fixed polarization ratio P which corresponds to a ratio of the polarized light to a sum of the polarized light and the non-polarized light, as the following equation 1.

$$P = \frac{I_p}{I_u + I_p} \quad \text{[Equation 1]}$$

In the equation 1, "P" is the polarization ratio, "Ip" is an amount of polarized light, and "Iu" is an amount of non-polarized light. In accordance therewith, when the polarization ratio is "0", light from the polarizer 175 becomes non-polarized light. On the contrary, if the polarization ratio has a value of "1", light from the polarizer 175 becomes polarized light.

The filter 177 passes a specific wavelength band (or a specific spectrum) of light among a board wavelength band (or a board spectrum) of light through it. More specifically, the filter 177 included in a first embodiment of the present disclosure eliminates a short wavelength band of light inducing a rejection reaction which generates a carboxylic acid. To rectify this, the filter 177 blocks off the short wavelength band of light below an effective wavelength band (or an effective spectrum) which is used in a photo alignment, in order to suppress the rejection reaction.

Therefore, the filter is preferably configured to include a high pass filter eliminating the short wavelength band of light, for example, lights having wavelengths below 250 nm. Although the high pass filter is explained to eliminate lights of the wavelengths below 250 nm, the filter included in a first embodiment is not limited to this. The wavelength band of light to be eliminated by the high pass filter can be changed by the desired specification.

Moreover, the filter 177 can be configured to further include a low pass filter eliminating lights of wavelengths above the effective wavelength band, for example, above 300 nm. The wavelength band of light to be eliminated by the low pass filter can also be changed by the desired specification. In this case, the filter 177 of the first embodiment enables only a specific wavelength band of light (i.e., wavelength lights of 250 nm~300 nm corresponding to the effective wavelength band of light) being filtering by the high and low pass filters to be irradiated onto the substrate 100.

In this manner, the light irradiation apparatus according to a first embodiment of the present disclosure eliminates either only the short wavelength band (i.e., below 250 nm) of light, or the long wavelength band (i.e., above 300 nm) of light and the short wavelength band (i.e., below 250 nm) of light, among the board wavelength band of light generated in its light source, using the filter 177. As such, the light irradiation apparatus can suppress the generation of a carboxylic acid due to the rejection reaction such as a photo oxidation reaction. Therefore, it can prevent the generation of residual images on the LCD device.

Figure 4:
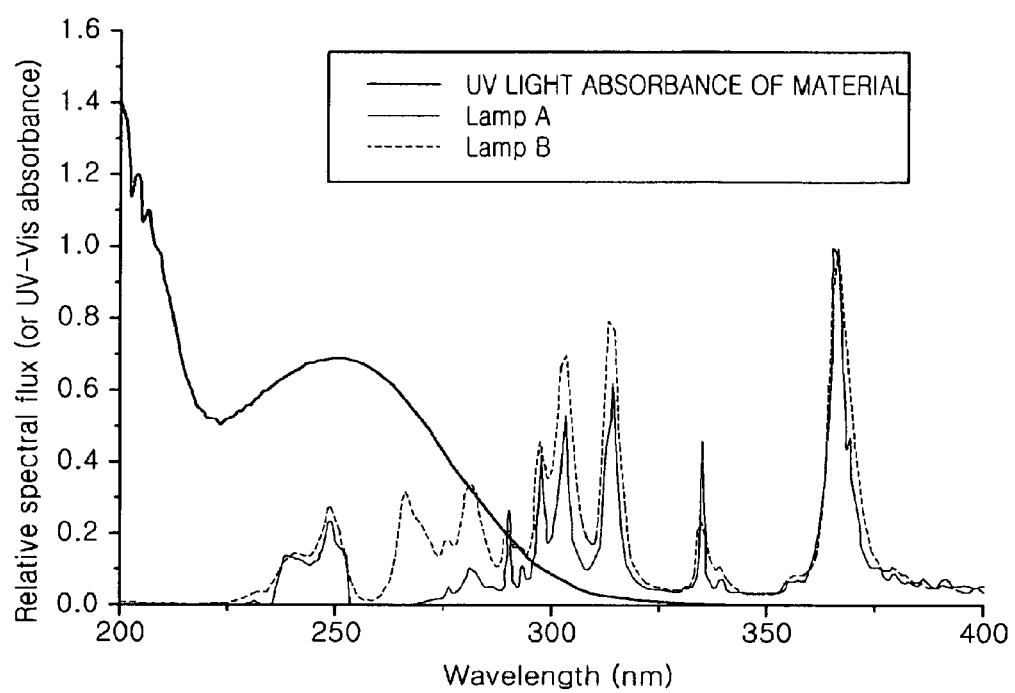
FIG. 4 is a data sheet representing a light spectrum of a light source included into a light irradiation apparatus according to a second embodiment of the present disclosure.
Figure 5:
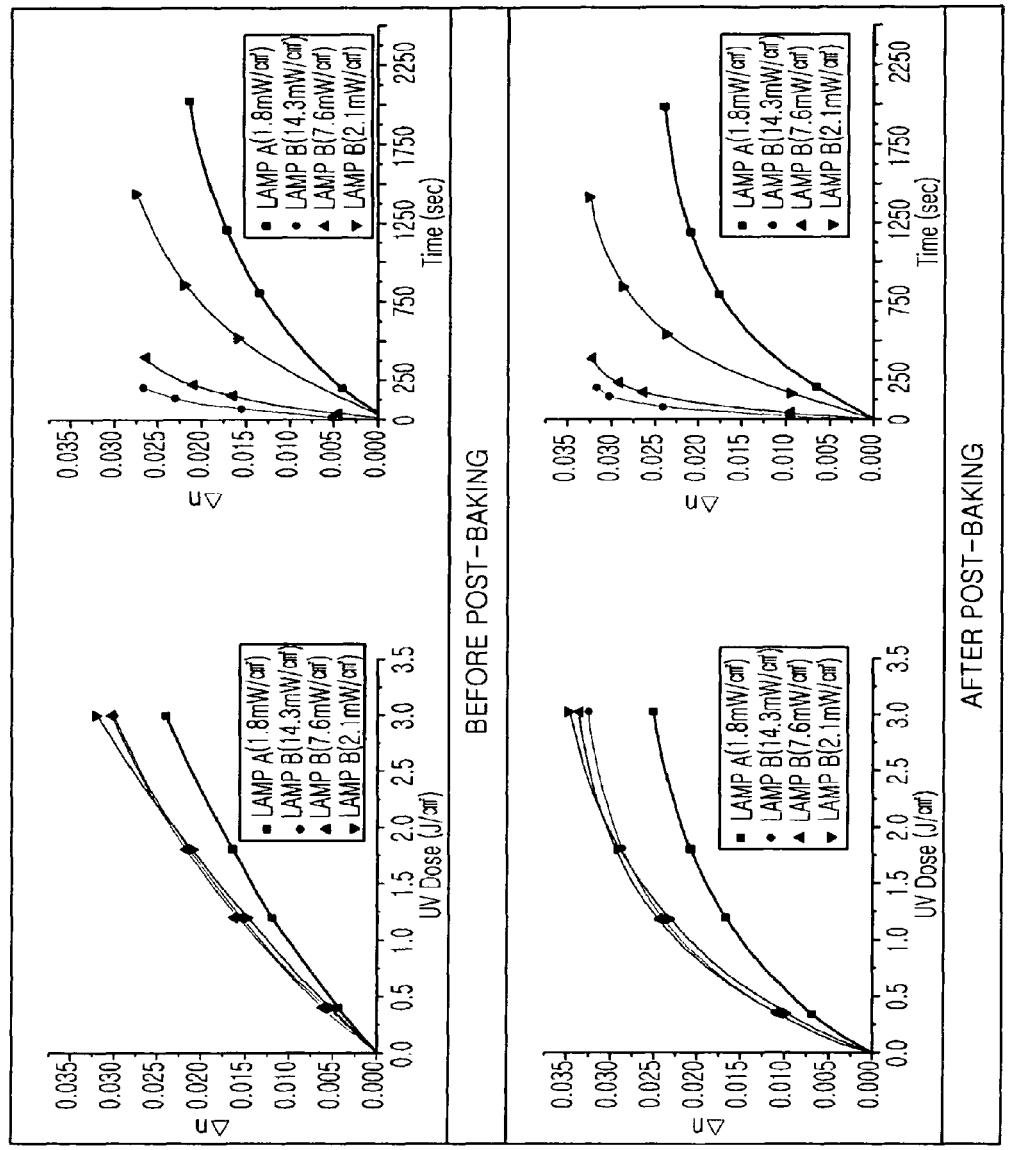
FIG. 5 is a data sheet representing a photo alignment time by a light irradiation apparatus with a light source having the light spectrum of FIG. 4.

FIG. 4 is a data sheet representing a light spectrum of a light source included into a light irradiation apparatus according to a second embodiment of the present disclosure. FIG. 5 is a data sheet representing a photo alignment time by a light irradiation apparatus with a light source having the light spectrum of FIG. 4.

A light irradiation apparatus according to a second embodiment of the present disclosure includes a specific light source (or a specific lamp) largely generating an effective wavelength band of light for a photo alignment. The specific light source (or a specific lamp) may be selected from a variety of UV light sources (or lamps) through a process of analyzing the light spectrum of the UV light sources shown in FIGS. 4 and 5.

The light spectrum of a first lamp A represents relatively low peak values within the effective wavelength band of 200 nm~330 nm. On the other hand, the light spectrum of a second lamp B represents relatively high peak values within the effective wavelength band of 200 nm~330 nm. In other word, the second lamp B generates more of the effective wavelength band light, but the first lamp A generates less of the effective wavelength band light. Moreover, it is evident that the second lamp B has an anisotropic reaching speed five times ~ several hundred times faster than that of the first lamp A in a photo alignment process.

In other words, the light irradiation apparatus according to a second embodiment of present disclosure uses the lamp (or light source) generating more of the effective spectrum light (i.e., the effective wavelength band light of about 200 nm~330 nm). As such, the light irradiation apparatus enables the photo alignment speed to become faster, so that the manufacturing time of an alignment film is reduced. Also, the light irradiation apparatus suppresses the generation of a carboxylic acid caused by the rejection reaction, thereby preventing the generation of residual images on an LCD device.

Figure 6:
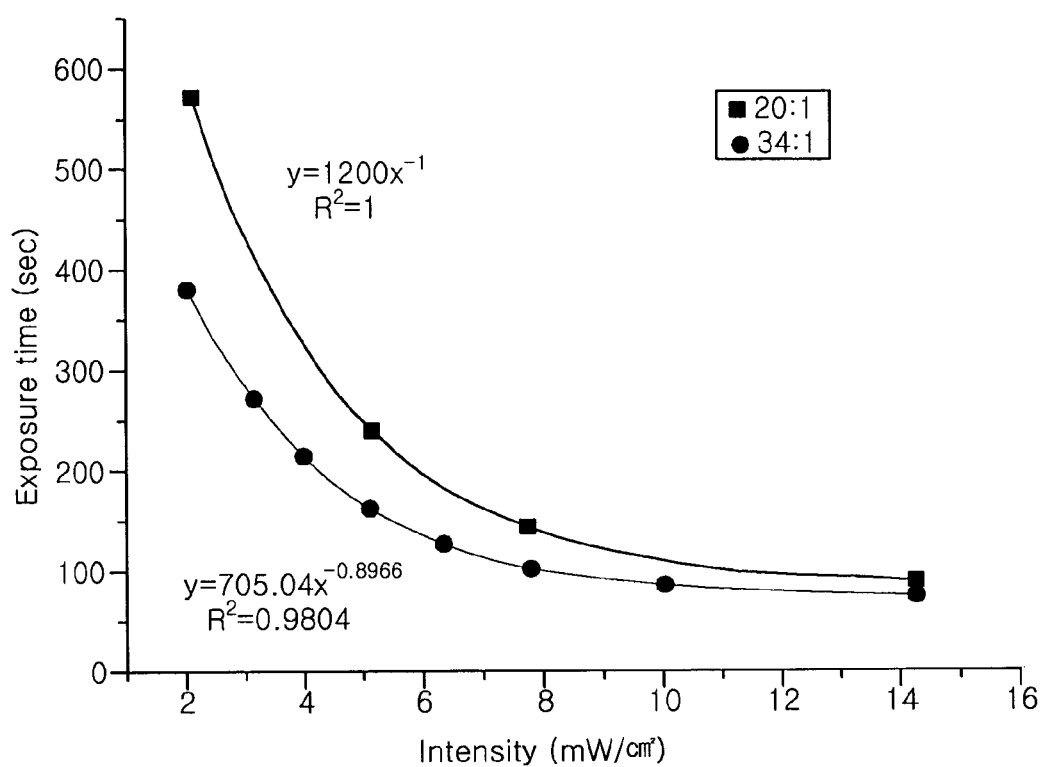
FIG. 6 is a data sheet representing an anisotropic reaching time of an alignment material along with the extinction ratio of a polarizer included in a light irradiation apparatus according to a third embodiment of the present disclosure.

FIG. 6 is a data sheet representing an anisotropic reaching time of an alignment material along with the extinction ratio of a polarizing portion included in a light irradiation apparatus according to a third embodiment of the present disclosure.

A light irradiation apparatus according to a third embodiment of the present disclosure employs a polarizer with an adjusted extinction ratio, in order to reduce the anisotropic reaching time of a previously selected alignment material. More specifically, the light irradiation apparatus of the third embodiment controls an extinction ratio of polarized light to be output from the polarizer (175 in FIG. 2). To rectify this, the light irradiation apparatus adjusts a ratio of p-polarized light to s-polarized light.

The data sheet represents the simulated data of an anisotropic reaching time when the extinction ratio (i.e., the ratio of p-polarized light to s-polarized light) is set up to a range of about 34:1~20:1. If a target has the same anisotropy as the alignment material, the polarizer adjusted at the extinction ratio of 34:1 can reduce the anisotropic reaching time rather than that adjusted at the extinction ratio of 20:1. In other words, the light irradiation apparatus of the third embodiment can decrease the photo alignment time by enlarging the ratio of p-polarized light to s-polarized light. The extinction ratio of the polarizer can be adjusted in accordance with the kind of alignment materials. Therefore, the extinction ratio of the polarizer can be established within a range of 200:1~3:1, even though the extinction ration of the polarizer is explained to be set in a range of 34:1~20:1.

In this way, the light irradiation apparatus according to a third embodiment of the present disclosure controls the extinction ratio (the ratio of p-polarized light to s-polarized light), thereby decreasing the anisotropic reaching time of the alignment material using a previously selected target. As such, the manufacturing time of the alignment film can be reduced. Also, the reduction of the manufacturing time suppresses the generation of carboxylic acids caused by the rejection reaction. As a result, the generation of residual images in an LCD device with the alignment film can be prevented.

As described above, the light irradiation apparatuses according to three embodiments of the present disclosure block off a specific wavelength band of UV light, use a light source generating more of an effective spectrum (or an effective wavelength band) of light, or control an extinction ratio (a ratio of p-polarized light to s-polarized light). Therefore, a manufacturing time of the alignment film is reduced and the generation of carboxylic acids caused by a rejection reaction is suppressed. As a result, the generation of residual images in an LCD device with the alignment films can be prevented.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A light irradiation apparatus comprising:
   a light source generating ultraviolet light;
   a polarizer polarizing the ultraviolet light generated in the light source; and a filter, separate from the polarizer, blocking off the polarized light from the polarizer except an effective wavelength band of light for a photo alignment,
wherein the filter includes a high pass filter blocking off a short wavelength band of light and a low pass filter blocking off a long wavelength band of light,
wherein the short wavelength band is in a wavelength range below 250 nm,
wherein the long wavelength band is in a wavelength range above 300 nm,
wherein the polarizer includes a plurality of quartz plates,
wherein the polarizer has an extinction ratio range of 34:1~20:1,
wherein a collimator is configured between the filter and a substrate to guide the light from the filter toward a substrate,
wherein the light source includes a lamp having a high peak value within the effective wavelength band of about 200 nm~330 nm.

* * * * *